US008870375B2

(12) United States Patent
Petignaud et al.

(10) Patent No.: US 8,870,375 B2
(45) Date of Patent: Oct. 28, 2014

(54) METHOD FOR ASSESSING AN OPTICAL FEATURE OF AN OPHTHALMIC LENS DESIGN

(75) Inventors: Cécile Petignaud, Charenton le Pont (FR); Benjamin Rousseau, Charenton le Pont (FR); Mathieu Guillot, Charenton le Pont (FR); Pauline Colas, Charenton le Pont (FR); Jean Sahler, Charenton le Pont (FR); Valérie Parmentier, Charenton le Pont (FR); Gilles Garcin, Charenton le Pont (FR); Cécile Pietri, Charenton le Pont (FR)

(73) Assignee: Essilor International (Compagnie Generale d'Optique), Charenton le Pont Cedex (FR)

( * ) Notice: Subject to any disclaimer, the term of this patent is extended or adjusted under 35 U.S.C. 154(b) by 225 days.

(21) Appl. No.: 13/318,339

(22) PCT Filed: Apr. 22, 2010

(86) PCT No.: PCT/EP2010/055377
§ 371 (c)(1),
(2), (4) Date: Apr. 5, 2012

(87) PCT Pub. No.: WO2010/124991
PCT Pub. Date: Nov. 4, 2010

(65) Prior Publication Data
US 2012/0188504 A1 Jul. 26, 2012

(30) Foreign Application Priority Data

Apr. 30, 2009 (EP) .................................... 09305389

(51) Int. Cl.
*G02C 7/02* (2006.01)
*G02C 7/06* (2006.01)

(52) U.S. Cl.
CPC ................ *G02C 7/061* (2013.01); *G02C 7/024* (2013.01); *G02C 7/028* (2013.01)
USPC ................................ 351/159.76; 351/159.77

(58) Field of Classification Search
CPC ......... G02C 7/061; G02C 7/024; G02C 7/028
USPC ............. 351/159.06, 159.42, 159.73, 159.74, 351/159.75, 159.76, 159.77, 178; 703/1
See application file for complete search history.

(56) References Cited

U.S. PATENT DOCUMENTS

| 6,074,062 A | 6/2000 | Morris et al. | |
|---|---|---|---|
| 2008/0282183 A1* | 11/2008 | Fisher et al. | 715/772 |
| 2010/0079722 A1* | 4/2010 | Guilloux et al. | 351/169 |

FOREIGN PATENT DOCUMENTS

| DE | 197 01 312 A1 | 7/1998 |
|---|---|---|
| EP | 1 987 997 A1 | 11/2008 |
| EP | 2 019 384 A2 | 1/2009 |
| EP | 2 034 078 A1 | 3/2009 |
| EP | 2 034 468 A1 | 3/2009 |
| WO | WO 01/25837 A1 | 10/2004 |

(Continued)

*Primary Examiner* — Darryl J Collins
*Assistant Examiner* — Gary O'Neill
(74) *Attorney, Agent, or Firm* — Cozen O'Connor

(57) ABSTRACT

A method for calculating or optimizing an ophthalmic lens design comprising the steps of providing a given ophthalmic lens design and assessing the given design by a computer comprising a media suitable for storing electronic instructions.

15 Claims, 6 Drawing Sheets

(56) References Cited

FOREIGN PATENT DOCUMENTS

| WO | WO 2004/086125 A | 10/2004 |
| WO | WO 2006/090132 A2 | 8/2006 |
| WO | WO 2006/125721 A1 | 11/2006 |
| WO | WO 2007/109760 A2 | 9/2007 |
| WO | WO 2007/118029 A2 | 10/2007 |
| WO | WO 2007/137110 A2 | 11/2007 |

* cited by examiner

METHOD FOR ASSESSING AN OPTICAL FEATURE OF AN OPHTHALMIC LENS DESIGN

RELATED APPLICATIONS

This is a U.S. National Phase Application under 35 USC 371 of International Application PCT/EP2010/055377 filed on Apr. 22, 2010.

This application claims the priority of European application no. 09305389.0 filed Apr. 30, 2009, the entire content of which is hereby incorporated by reference.

FIELD OF THE INVENTION

The invention relates generally to the field of vision improvement and more specifically concerns a method for assessing an optical feature of a spectacle ophthalmic lens design. The ophthalmic lens can be, e.g., a progressive lens, a unifocal lens. The unifocal lens can be for example an aspheric lens. The invention also concerns a method for calculating or optimizing an ophthalmic lens design and a method for manufacturing a spectacle ophthalmic lens. Furthermore, the invention concerns a piece of software set up for implementing the methods of the invention, and graphical interface.

BACKGROUND OF THE INVENTION

Spectacle ophthalmic lenses are worn and widely used for correcting many different types of vision deficiencies. These include defects such as near-sightedness (myopia) and far-sightedness (hypermetropia), astigmatism, and defects in near-range vision usually associated with aging (presbyopia).

Ophthalmologists or optometrists routinely improve the visual acuity of a wearer by correcting refractive errors of his eyes in terms of sphere (SPH), cylinder (CYL) and cylinder axis (AXE). Near vision zone addition power (ADD) is also prescribed when the wearer is presbyotic. Other data may be prescribed, in particular a prism in certain specific cases.

A lens design, in this document, is what characterises an ophthalmic product. The wording "ophthalmic product" refers to a lens family for all prescriptions where all the lenses of the lens family have common features.

In the frame of the present invention a "design" of a spectacle ophthalmic lens has to be understood as the features of the optical system of said lens which are not directly determined by the wearer standard prescription parameters consisting of sphere, cylinder, cylinder axis and power addition values determined for said wearer.

In other words, a "design" is a widely used wording known from the man skilled in the art to designate the set of parameters, except here above mentioned wearer standard prescription parameters, allowing defining an optical function of a generic optical system; each ophthalmic lens manufacturer has its own designs, particularly for aspherical lenses and for progressive addition lenses (PAL). As for an example, a PAL "design" results of an optimization of the progressive surface so as to restore a presbyope's ability to see clearly at all distances but also to optimally respect all physiological visual functions such as foveal vision, extra-foveal vision, binocular vision and to minimize unwanted astigmatisms. PAL "designs" are tested through rigorous clinical trials before being commercialized.

Ophthalmic lens manufacturers do continuously improve the optical performances of their lens designs.

According to current trends, designs may also be suitable to take into account a number of design particularities, including for example personalization parameters.

The resulting optical features of an ophthalmic lens design within given prescription ranges are not easy to determine because numerous parameters have to be taken into account. Furthermore, it is also difficult to compare on a reliable way different ophthalmic lens designs within given prescription ranges. Said optical features determinations or design comparisons are done, up to now, on a point by point basis where only some characteristic points of a lens and a very limited number of prescription data are chosen.

SUMMARY OF THE INVENTION

One object of the invention is to better assess optical features of an ophthalmic lens design over at least a prescription domain.

This and other objects are attained in accordance with one aspect of the invention directed to a method of assessing at least a selected optical feature of an ophthalmic lens design over a prescription and optionally design particularity domain comprising the steps of:

a) selecting a prescription and optionally design particularity parameters set comprising a plurality of prescription parameters in the list consisting of spherical power (SPH), cylindrical power (CYL), cylinder axis (AXE), addition power (ADD) with the proviso that the ophthalmic lens is a progressive addition lens (PAL) and selecting a prescription and optionally design particularity range for each selected prescription and optionally design particularity parameters so as to define the prescription and optionally design particularity domain;

b) meshing the prescription and optionally design particularity domain so as to obtain a representative sample of coordinates within the prescription and optionally design particularity domain and thus providing a plurality of meshing coordinates where each coordinate consists of a series of values of the selected prescription and optionally design particularity parameters within their prescription and optionally design particularity range;

c) providing an assessment criterion for the selected optical feature of the ophthalmic lens design;

d) calculating the assessment criterion value for each meshing coordinate of step b);

e) providing a sensory representation of the assessment criterion values over the prescription and optionally design particularity domain.

According to an embodiment, said method is implemented by computer means.

The vocabulary used in the present document mainly refers to the International Standard ISO 13666, "Ophthalmic Optics-spectacle lenses-vocabulary" reference number ISO 13666: 1998 (E/F).

In the framework of the invention, the following terms have the meanings indicated herein below:

"prescription parameters" are optical characteristics such as spherical power (SPH, also called optical power), cylindrical power (CYL, also called "cylinder"), cylinder axis (AXE), addition power (ADD), prescribed prism, determined by an ophthalmologist in order to correct the vision defects of an individual, for example by means of a lens positioned in front of his eye. The term 'astigmatism' is used to denote the data pair formed by an amplitude value and a value of angle. Although this is an abuse of language, it is also sometimes used to denote the amplitude of the astigmatism only. Astigmatism in an eye occurs when the refractive error is meridian-dependent. This is usually due to one or more refractive surfaces, most commonly the anterior cornea, having a toroidal shape. The context allows those skilled in the art to understand which usage of the term is intended. Generally speaking, the prescription data for a progressive addition lens comprise values of optical power (SPH), of astigmatism (CYL) and cylinder axis (AXE) at the distance-vision point, and an addition value (ADD);

"design particularities" are design features that give a major trend to a design, such as for example progression channel length, addition repartition between the front face and the back face of the lens, near and/or intermediate and/or far vision zone size; they may also include personalization features suitable to optimize a lens design for a wearer, such as personalization of preceding design particularities, or inset of the wearer, eye-head coefficient of the wearer;

an "optical feature" is a whole lens optical parameter or a lens surface parameter of a lens, or a combination of a plurality of whole lens optical parameters and/or lens surface parameters of said lens; the wording "whole lens" refers to the optical system defined by all the surfaces of the lens, the index of the lens and the position of each surface relatively to each other, and, optionally, the position of the lens compared to the eye of the wearer (i.e. wearing conditions); the wording "lens surface" refers to one of the surfaces of the lens;

regarding PAL, a distance-vision region is the region of a progressive addition lens that surrounds the distance-vision point (also called "distance reference point") and within which the local optical characteristics of optical power and of astigmatism of the lens are substantially identical to those at the distance-vision point; a near-vision region is the region of a progressive addition lens that surrounds the near-vision point (also called "near visual point"), and within which the local optical characteristics of optical power and of astigmatism of the lens are substantially identical to those of the near-vision point; an addition power (ADD) of a progressive addition lens is the difference between the value of optical power of the lens at the near-vision point and that at the distance-vision point;

a "prescription and optionally design particularity range" refers to a range of values for a given prescription and optionally design particularity parameter;

a "prescription and optionally design particularity domain" refers to a plurality of prescriptions and optionally design particularity ranges, each defined for a prescription and optionally design particularity parameter within a plurality of prescription and optionally design particularity parameters.

Thanks to the present method of assessing selected features of an ophthalmic lens design, one can obtain a representation of assessment criterion values over a whole prescription and optionally design particularity domain on a reliable way. A lens designer or an eye care practitioner can thus evaluate desired features of a given lens design, or compare different lens designs, for a specified prescription and optionally design particularity domain.

According to different embodiments of the present method of assessing, that may be combined:

the ophthalmic lens is a PAL and the prescription parameter set of step a) further comprises a design particularity parameter chosen in the list consisting of eye-head coefficient, progression channel length, inset, addition repartition between the front face and the back face of the lens;

the assessment criterion is a function of a whole lens optical parameter and said whole lens optical parameter is chosen in the list consisting of optical power, astigmatism, resulting astigmatism, astigmatism axis, optical power gradient, astigmatism gradient, resulting astigmatism gradient and where said whole lens optical parameter is determined according to at least a given gaze direction, chosen for example in the list consisting of far vision direction passing through the distance reference point, near vision direction passing through the near visual point, direction passing through the meridian line for a given reached addition value, directions passing through the distance-vision region, directions passing through the near-vision region, directions passing through the progression region;

the assessment criterion is a function of a lens surface parameter and said lens surface parameter is chosen in the list consisting of sphere value, cylinder value, sphere value gradient, cylinder value gradient and where said lens surface parameter is determined according to at least a given surface point, chosen for example in the list consisting of geometrical center, prism reference point (PRP), distance reference point, near visual point, design reference point, points within the distance-vision zone, points within the near-vision region, points within the progression region;

the preceding function is chosen in the list consisting of identity function, mean function, square mean function, weighted mean function, field value between two gaze directions or between two surface points, area where the assessment parameter is comprised between threshold values, YES or NO binary functions, comparison function with another design, complex mathematical functions, number of gradient sign change within a range, functions provided by an expert system, or a combination thereof; an expert system can be a software using neural networks for solving artificial intelligence problems or statistical calculations defined knowing other lens design characteristics;

the sensory representation of step e) is chosen in the list consisting of visual representations, auditory representations, odour representations, tactile representations, gustatory representations, or a combination thereof; according to an embodiment the visual representation consists in visualizing the variation of the assessment criterion over the prescription and optionally design particularity domain of step a) or over a zone of said prescription and optionally design particularity domain;

the method of assessing further comprises the step f) of marking the sensory representation so as to obtain an assessment value referred to an assessment scale according to an embodiment, the assessment scale is a colour chart.

Another aspect of the invention relates to a graphical interface for the visualization of the assessment criterion values calculated according to preceding method of assessing where said values are visualized over the prescription and optionally design particularity domain according to a 2D or 3D representation.

Another aspect of the invention is directed to a method for calculating or optimizing an ophthalmic lens design comprising the steps of:

providing a given ophthalmic lens design;
assessing the given design according preceding method of assessing.

According to different embodiments of said method for calculating or optimizing an ophthalmic lens design:
a design parameter of the given design is modified so as to provide a modified design and the modified design is evaluated, as for example is compared with the given design and/or evaluated, for example thanks to the assessing method according to preceding method of assessing;
the design parameter modification is repeated until reaching a threshold value over the prescription and optionally design particularity domain or over a sub-domain of said domain for said design parameter.

Another aspect of the present invention relates to a method of manufacturing an ophthalmic lens according to a given prescription comprising the steps of:
providing a lens blank;
machining at least a surface of the lens blank so as to obtain a lens fitting the calculated or optimized ophthalmic lens design and the given prescription.

The lens blank can be a semi-finished product with a front face fitting the calculated or optimized design; in this case, only the back face is machined so as to fit the given prescription.

Another aspect of the invention relates to a computer program product comprising one or more stored sequence of instruction that is accessible to a processor and which, when executed by the processor, causes the processor to carry out at least one of the steps of the different embodiments of the preceding methods.

Another aspect of the invention relates to a computer-readable medium carrying one or more sequences of instructions of the preceding computer program product.

Unless specifically stated otherwise, as apparent from the following discussions, it is appreciated that throughout the specification discussions utilizing terms such as "computing", "calculating" "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

The features of the present invention, as well as the invention itself, both as to its structure and its operation, will be best understood from the accompanying non limiting drawings and examples, taken in conjunction with the accompanying description, in which.

DETAILED DESCRIPTION OF THE DRAWINGS

Figure 1:
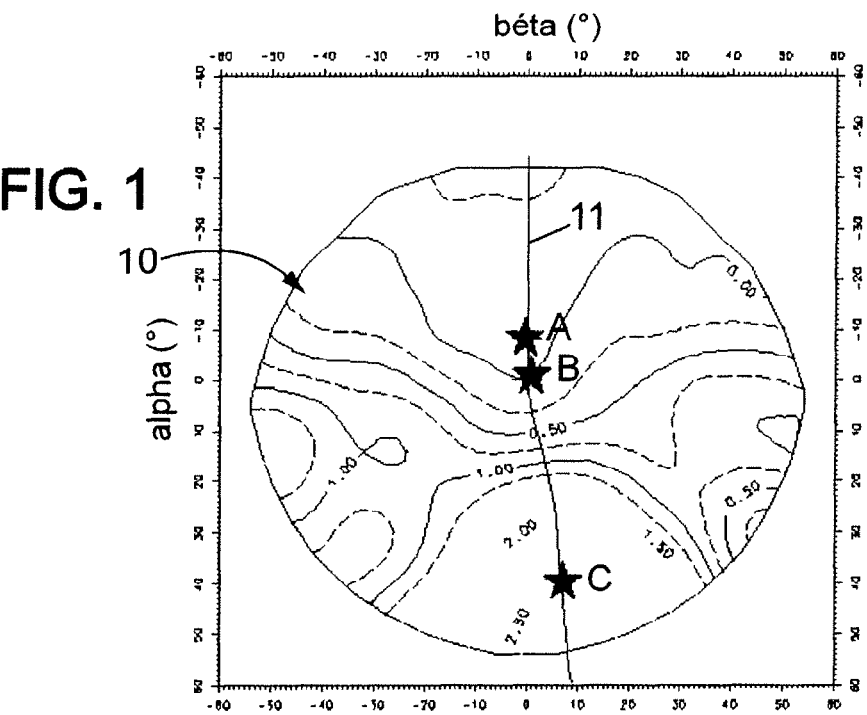
FIG. 1 shows an example of a progressive addition lens power-map comprising examples of characteristic points used within the frame of the present invention.
Figure 2:
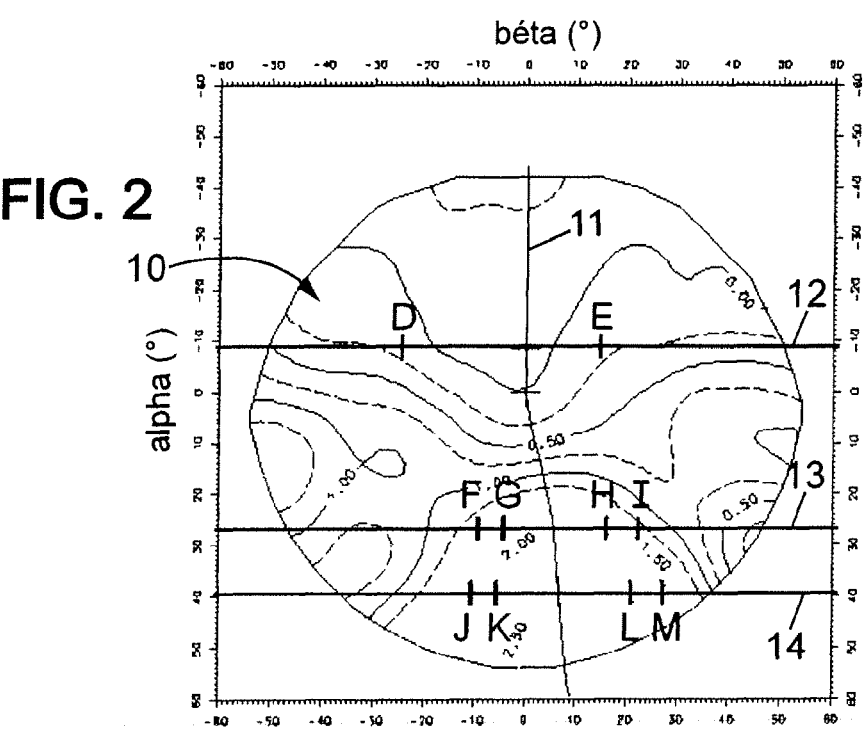
FIG. 2 shows an example of a progressive addition lens power-map comprising examples of characteristic zones used within the frame of the present invention.

FIGS. 1 and 2 show a power contour plot map of a progressive addition lens 10 where conventionally the power isocurves are drafted according to two gaze direction angles, named ALPHA (vertical angle) and BETA (lateral angle). The power difference between two lines is 0.25 Diopter. The line 11 corresponds to the "angular meridian line" which corresponds to the path of the gaze from top to down.

Examples of characteristic points where lens surface parameters can be assessed according to the present invention are shown on FIG. 1 where point A is the distance reference point, point B is the mounting cross, point C is the near visual point.

Examples of points that can be selected in order to assess a field value between two points are shown on FIG. 2. Points D and E are situated in the distance-vision zone on the line 12 at the same ALPHA value. Points D and E are respectively situated on the temporal and the nasal side of the lens at the same power value which corresponds to +0.25 Diopter compared to power value at the point that intersects the angular meridian line 11 and the line 12. The distance between D and E defines a 0.25 Diopter vision field in the distance vision region.

Points F, G, H, I are situated in a zone situated laterally to a direction of the angular meridian line 11 where a specified addition value is reached along line 13, at the same ALPHA value. Points F and G, H and I are situated on the temporal, respectively the nasal side of the lens. Points G and H are situated at +0.25 Diopter compared to the power value at the point that intersects the angular meridian line 11 and the line 13, whereas points F and I are situated at +0.50 Diopter compared to the same point. Fields in this region are accordingly defined.

Points J, K, L, M are situated in a zone situated laterally to the near vision zone along line 14 at the same ALPHA value. Points J and K, L and M are situated on the temporal, respectively the nasal side of the lens. Points K and L are situated at +0.25 Diopter compared to the power value at the point that intersects the angular meridian line 11 and the line 13, whereas points J and M are situated at +0.50 Diopter compared to the same point. Fields in the progressive region are accordingly defined.

FIGS. 3 to 6 relate to presentations of assessment values regarding progressive addition lens designs.

According to a frequently used embodiment, a lens design is implemented by a lens manufacturer according to a limited number of base-curves series. Semi-finished lens blanks are manufactured according to said base-curves with the chosen design. Each base-curve is characterized by its curvature. The "curvature" of an optical surface is the curvature in a zone or at a specific point of said surface. If the surface is spherical, the curvature is constant and can be determined everywhere. If the surface is a single vision aspheric surface, its curvature is usually measured or determined at the optical center. If the surface is a progressive addition surface, its curvature is usually measured or determined at the distance-vision point. The here above mentioned points are preferred but not limiting points where a curvature according to the present invention can be measured or determined;

The base-curves are usually expressed referring to a standard refraction index of 1.53, whereas other refraction index may also be used to refer and express base-curves.

The front face of a semi-finished lens blank is usually intended to be the final front surface of the final lens and the other face is machined so as the optical system of the final lens fits the wearer ophthalmic prescriptions. Some minor machining of the front face may occur, but without modifying its curvature.

Semi-finished lens blanks are usually obtained by injection moulding or by casting into moulds. They also can be produced by machining a blank.

Manufacturers typically produce a series of semi-finished lens blanks, each having its own base curve. This "base-curve series" is a system of semi-finished lens blanks that front faces increase incrementally in curvature.

The front surface of a semi-finished lens blank of a base-curve series serves as the starting point from which the optical surface of the back surface will be calculated and the final lens be manufactured according to a wearer prescription (or focal power).

The front surfaces of the semi-finished lens blanks of a "base-curve series" may be spheres, aspheric surfaces, progressive addition surfaces.

As for an example, progressive addition lenses (PAL) may be manufactured thanks to semi-finished lens blanks with spherical or aspheric front surfaces and the progressive addition surface is machined to form the rear face of the final lens. They can also be manufactured thanks to semi-finished lens blanks with progressive addition surfaces and the rear face of the blank is machined so as to form a spherical or toric surface. It is also possible to manufacture PAL thanks to semi-finished lens blanks with progressive addition surfaces and to machine the rear face of the lens blank so as to obtain a second progressive addition surface and provide "dual add" PAL.

Each base-curve in a series is conventionally used for producing a range of prescription, as specified by the manufacturer. Manufacturers use base-curve selection charts that provide the recommended prescription ranges for each base-curve in the series. The selection chart indicates one base-curve to be chosen according to a given prescription as a function of the spherical power SPH and of the cylindrical power CYL for curing an astigmatic vision. FIGS. 3 to 6 illustrate a representation based on a selection chart which relates to a progressive addition lens (PAL) in which a power continuously changes between a distance portion and a near portion. The same type of selection chart is widely used for every kind of ophthalmic lenses such as for example single vision lenses (such as spherical and/or torical, aspherical lenses), bi-focal lenses, PAL.

The selection chart of FIGS. 3 to 6 comprises 6 base-curves where the curvature of the different base-curves for a refractive index of 1.53 is 1.75 Diopter in zone 1; 2.75 Diopter in zone 2; 3.75 Diopter in zone 3; 5.25 Diopter in zone 4; 6.6. Diopter in zone 5; 8.0 Diopter in zone 6.

FIGS. 3 to 6 represent variations of differences between two design values of an assessment criterion, where the two designs have the same selection chart according to sphere (SPH) and cylinder (CYL).

It would also be possible to compare two designs which would not have the same selection chart according to chosen prescription parameters and define common zones where the comparison would be easy to handle.

Figure 3:
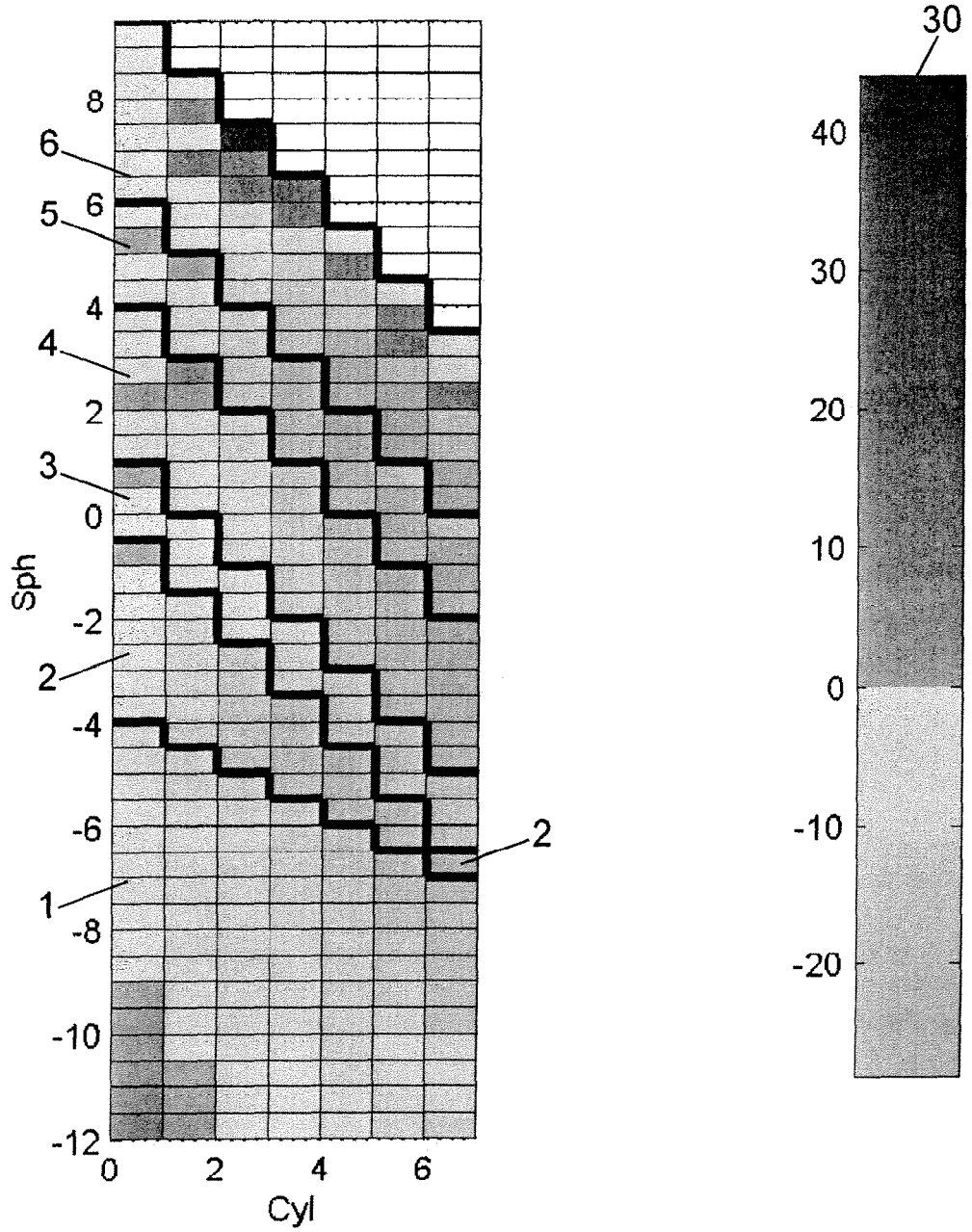
FIGS. 3 to 6 show different examples of representation of assessment criteria according to the present invention.

FIG. 3 represents the variation of the difference between two lens designs values of an assessment criterion example consisting of the resulting astigmatism width measured at the distance vision point (A of FIG. 1) for a cylinder axis equal to 0 and an addition equal to 1.50 Diopter. The variation scale 30 represents the variation of said value in grey levels. Said variation scale can also be a colour chart. One can see that difference in resulting astigmatism at the distant vision point has a positive value for example when the cylinder value is less than 2 Diopter and for the 8 Diopter base-curve domain (zone 6). According to an embodiment, the lens designer wishes that the difference in resulting astigmatism at the distant point between the two designs to be homogeneous over the whole prescription domain. He will thus make a new design calculation, and will focus his effort on cylinder values less than 2 Diopter and zone 6 so as to obtain homogeneously a negative value over the whole prescription domain.

Figure 4:
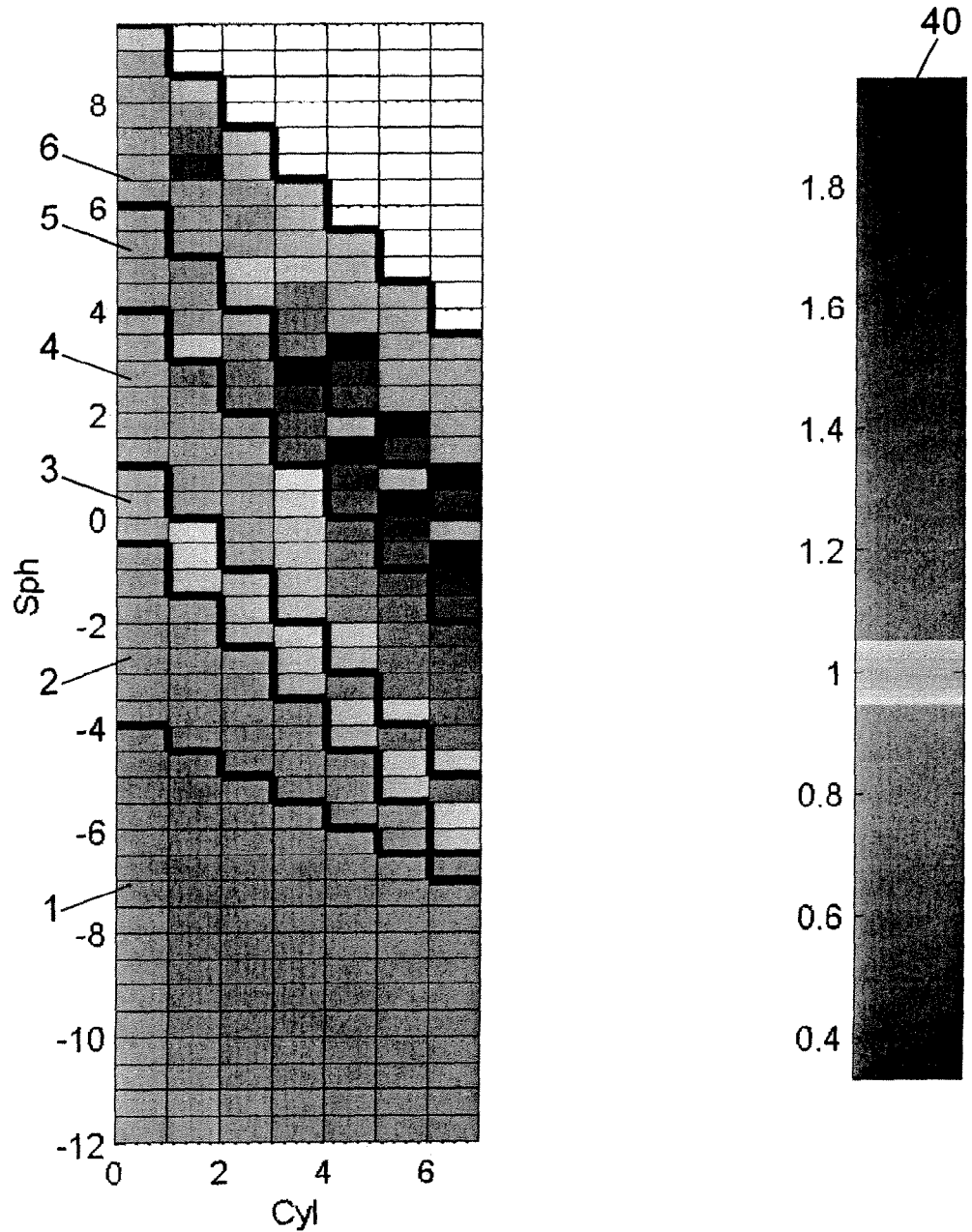

FIG. 4 represents the variation of the difference between two lens designs values of another assessment criterion example regarding the design symmetry, for a cylinder axis of zero and an addition of 1.50 Diopter. Said criterion is calculated as following: one calculates the difference between two iso-astigmatism half width for a +0.25 Diopter variation at the alpha position of the distance vision point (points D and E of FIG. 2, on line 12). Results are presented in percentages of the difference between the half width values according to scale 40. One can then compare the iso-astigmatism half width between two designs and estimate the best "symmetry" between the two designs. Said optimal symmetry may vary from a zone to another. According to an embodiment, the lens designer will determine and select the most symmetric design in the different zones of the prescription domain. Said selection will help the designer to optimize the symmetry between the nasal and the temporal part of a lens according to a resulting design on the whole domain.

Figure 5:
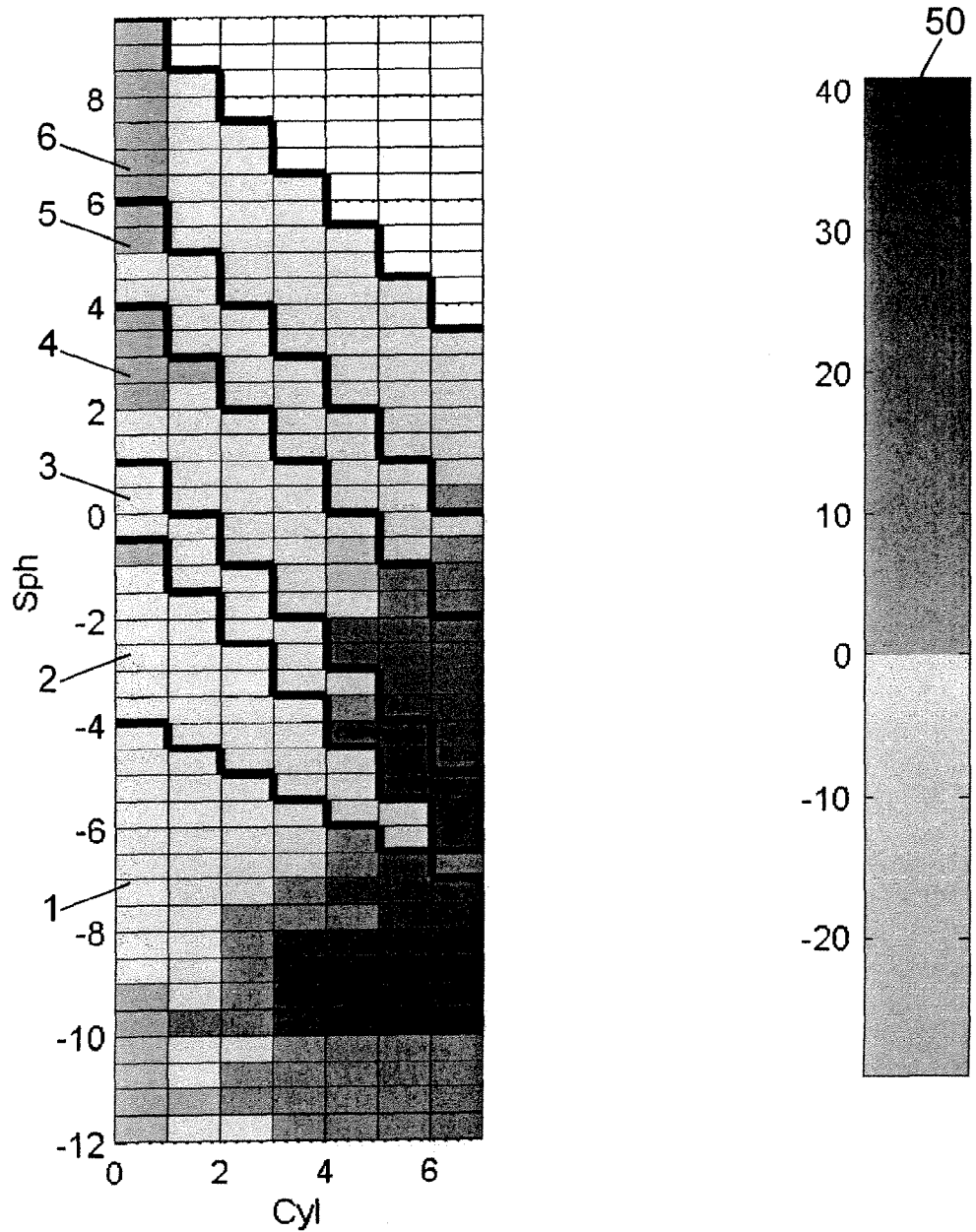

FIG. 5 represents the variations of the difference between two lens design values of another assessment criterion example regarding the power width for iso power values at points of a zone situated laterally to a direction of the angular meridian line 11 where a specified addition value is reached along line 13, at the same ALPHA value for a 0.50 Diopter variation (point F and I of FIG. 2, on line 13), for a cylinder axis of zero and an addition of 1.5 Diopter. Results are presented according to scale 50.

Figure 6:
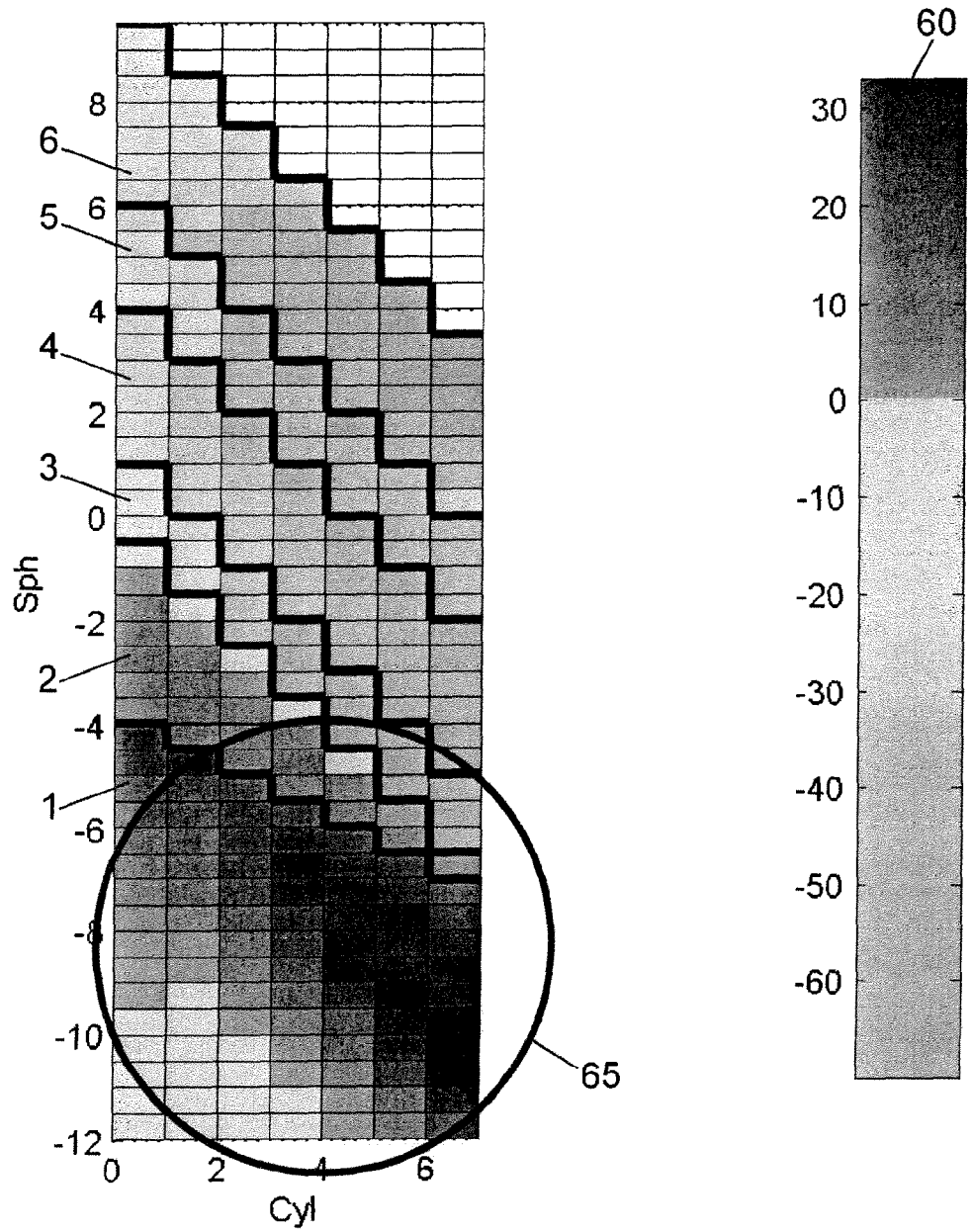

FIG. 6 represents the variation of the difference between two lens design values of another assessment criterion example regarding the power width for iso power values at points in a zone situated laterally to the distance vision region for a 0.25 Diopter variation (points D and E of FIG. 2, on line 12) where the cylinder axis is 90° and the addition is 2.5

Diopter. A zone 65 is of particular interest. One can see that the difference of said assessment criterion is very important for the prescription of zone 1 corresponding to the base-curve of 1.75 Diopter. According to an embodiment, the lens designer will use this information to optimize the second design in said zone in order to obtain a relatively uniform value of the power width for iso power values between points D and E over the whole prescription range.

Figure 7:
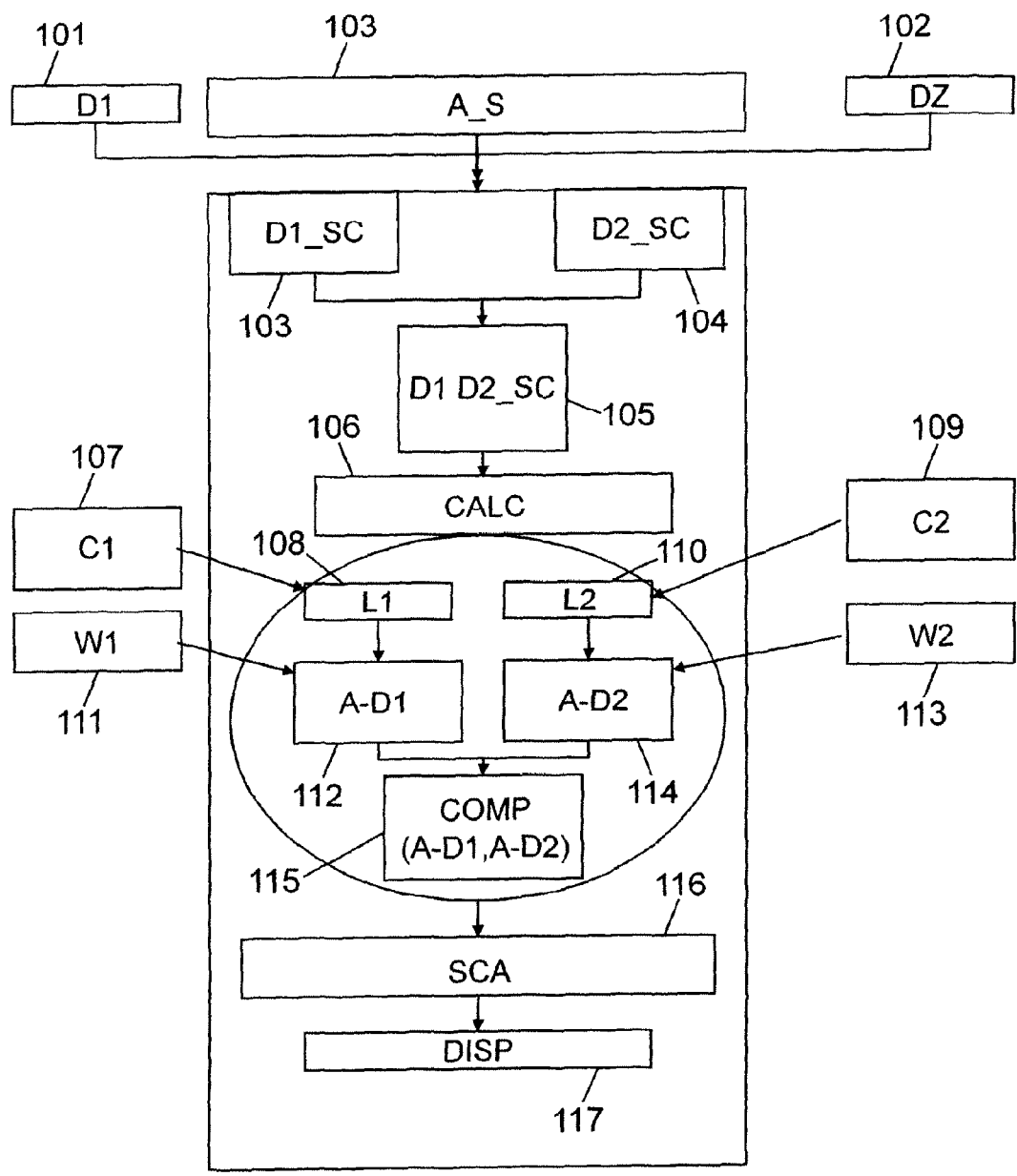
FIG. 7 shows a schematic block diagrams enlightening steps of a method according to the present invention.

FIG. 7 shows a schematic block diagram enlightening steps of a method according to the present invention, where input data are the choice of a first design D1, step 101, the choice of a second design D2, step 102, the choice of the analysis type, A_S, step 103, according to the chosen prescription and optionally design particularity parameters. Other input data are the choice of a customization criterion C1, step 107, and C2, step 109 respectively for the first and second design. Wearing conditions W1, W2, such as wrap, pantoscopic angle can also be introduced for each design in steps 111, 113.

The selection charts D1_SC, step 103, D2_SC, step 104 of respectively the first and the second design are taken into account so as to define a selection chart D1 D2_SC, in step 105, suitable for both designs.

The prescription and optionally design particularity domain for the chosen prescription and optionally design particularity parameters is defined and meshed so as to obtain a representative sample of coordinates within the prescription and optionally design particularity domain. Calculation of the assessment criterion is done in step 106, CALC, comprising steps 108, 110 where the calculation of the optical features of the lenses L1, L2 according to customization criterions C1, C2, and wearing conditions W1, W2 of respectively the first and second design are made, steps 112, 114 where the assessment criteria A-D1, A-D2 are calculated for each design and combined thanks to a comparison function COMP, step 115. Said calculation is made for the meshing coordinates of the prescription and optionally design particularity domain.

An assessment scale, SCA, is determined in step 116 so as to optimize visualisation of the results. Said scale may be for example defined so as to cover a range between the maximum and the minimum values of COMP (A-D1, A-D2). The results are then displayed in step 117, DISP, for example according to the selection chart D1 D2_SC, or a zone of said selection chart, and the values of COMP (A-D1, A-D2) are visualised accordingly, using for example a colour chart.

The user can then easily take into account the visualised information to compare the two lens designs and for example can also use said information to optimize one of the two designs.

The invention has been described above with the aid of embodiments without limitation of the general inventive concept, in particular numerous assessment criteria can be chosen, and numerous features of all kinds of ophthalmic spectacle lens can be assessed accordingly to the present invention.

The invention claimed is:

1. A method for calculating or optimizing an ophthalmic lens design comprising the steps of:
   providing a given ophthalmic lens design; and
      assessing the given design by computer means comprising a media suitable for storing electronic instructions realizing the following steps:
   a) selecting a prescription and optionally design particularity parameters set comprising a plurality of prescription parameters in the list consisting of spherical power (SPH), cylindrical power (CYL), cylinder axis (AXE), addition power (ADD) with the proviso that the ophthalmic lens is a progressive addition lens (PAL) and selecting a prescription and optionally design particularity range for each selected prescription and optionally design particularity parameter so as to define the prescription and optionally design particularity domain;
   b) meshing the prescription and optionally design particularity domain so as to obtain a representative sample of coordinates within the prescription and optionally design particularity domain and thus providing a plurality of meshing coordinates where each coordinate consists of a series of values of the selected prescription and optionally design particularity parameters within their prescription and optionally design particularity range;
   c) providing an assessment criterion for the selected optical feature of the ophthalmic lens design;
   d) calculating the assessment criterion value for each meshing coordinate of step b); and
   e) providing a sensory representation of the assessment criterion values over the prescription and optionally design particularity domain.

2. The method of claim 1, wherein the ophthalmic lens is a PAL and the prescription and optionally design particularity parameter set of step a) further comprises a design particularity parameter chosen in the list consisting of eye-head coefficient, progression channel length, inset, addition repartition between the front face and the back face of the lens.

3. The method of claim 1, wherein the assessment criterion is a function of a whole lens optical parameter and said whole lens optical parameter is chosen in the list consisting of optical power, astigmatism, resulting astigmatism, astigmatism axis, optical power gradient, astigmatism gradient, resulting astigmatism gradient and where said whole lens optical parameter is determined according to at least a given gaze direction, chosen for example in the list consisting of far vision direction passing through the distance reference point, near vision direction passing through the near visual point, direction passing through the angular meridian line for a given reached addition value, directions passing through the distance-vision region, directions passing through the near-vision region, directions passing through the progression region.

4. The method of claim 3, wherein the function is chosen in the list consisting of identity function, mean function, square mean function, weighted mean function, field value between two gaze directions or between two surface points, area where the assessment parameter is comprised between threshold values, YES or NO binary functions, comparison function with another design, complex functions, functions provided by an expert system or a combination thereof.

5. The method of claim 1, wherein the assessment criterion is a function of a lens surface parameter and said lens surface parameter is chosen in the list consisting of sphere value, cylinder value, sphere value gradient, cylinder value gradient and where said lens surface parameter is determined according to at least a given surface point, chosen for example in the list consisting of geometrical center, prism reference point, distance reference point, near visual point, design reference point, points within the distance-vision zone, points within the near-vision region, points within the progression region.

6. The method of claim 5 wherein the function is chosen in the list consisting of identity function, mean function, square mean function, weighted mean function, field value between two gaze directions or between two surface points, area where the assessment parameter is comprised between threshold values, YES or NO binary functions, comparison function with another design, complex functions, functions provided by an expert system or a combination thereof.

7. The method of claim 1, wherein the sensory representation of step e) is chosen in the list consisting of visual representations, auditory representations, odour representations, tactile representations, gustatory representations, or a combination thereof.

8. The method of claim 7, where the visual representation consists in visualizing the variation of the assessment criterion over the prescription and optionally design particularity domain of step a) or over a zone of said prescription and optionally design particularity domain.

9. The method of claim 8, further comprising the following step:
   f) marking the sensory representation so as to obtain an assessment value referred to an assessment scale, wherein the assessment scale is a colour chart.

10. The method of assessing of claim 1, further comprising the following step:
    f) marking the sensory representation so as to obtain an assessment value referred to an assessment scale.

11. The method of claim 1, wherein a design parameter of the given design is modified so as to provide a modified design and the modified design is evaluated by assessing the modified design by realizing the steps a) to e).

12. The method of claim 11, wherein the design parameter modification is repeated until reaching a threshold value, over the prescription and optionally design particularity domain or over a sub-domain of said design particularity domain.

13. A graphical interface for the visualization of the assessment criterion values calculated by computer means comprising a media suitable for storing electronic instructions by realizing the following steps:
   a) selecting a prescription and optionally design particularity parameters set comprising a plurality of prescription parameters in the list consisting of spherical power (SPH), cylindrical power (CYL), cylinder axis (AXE), addition power (ADD) with the proviso that the ophthalmic lens is a progressive addition lens (PAL) and selecting a prescription and optionally design particularity range for each selected prescription and optionally design particularity parameter so as to define the prescription and optionally design particularity domain;
   b) meshing the prescription and optionally design particularity domain so as to obtain a representative sample of coordinates within the prescription and optionally design particularity domain and thus providing a plurality of meshing coordinates where each coordinate consists of a series of values of the selected prescription and optionally design particularity parameters within their prescription and optionally design particularity range;
   c) providing the assessment criterion for the selected optical feature of the ophthalmic lens design;
   d) calculating the assessment criterion values for each meshing coordinate of step b); and
   e) providing a sensory representation of the assessment criterion values over the prescription and optionally design particularity domain,
   wherein said values are visualized over the prescription and optionally design particularity domain according to a 2D or 3D representation.

14. A non-transitory computer readable medium carrying one or more sequences of instructions that is accessible to a processor and which, when executed by the processor, causes the processor to carry out the following steps:
   a) selecting a prescription and optionally design particularity parameters set comprising a plurality of prescription parameters in the list consisting of spherical power (SPH), cylindrical power (CYL), cylinder axis (AXE), addition power (ADD) with the proviso that the ophthalmic lens is a progressive addition lens (PAL) and selecting a prescription and optionally design particularity range for each selected prescription and optionally design particularity parameter so as to define the prescription and optionally design particularity domain;
   b) meshing the prescription and optionally design particularity domain so as to obtain a representative sample of coordinates within the prescription and optionally design particularity domain and thus providing a plurality of meshing coordinates where each coordinate consists of a series of values of the selected prescription and optionally design particularity parameters within their prescription and optionally design particularity range;
   c) providing the assessment criterion for the selected optical feature of the ophthalmic lens design;
   d) calculating the assessment criterion values for each meshing coordinate of step b); and
   e) providing a sensory representation of the assessment criterion values over the prescription and optionally design particularity domain.

15. A method for calculating or optimizing an ophthalmic lens design comprising the steps of:
   providing a given ophthalmic lens design;
   assessing the given design by computer means comprising a media suitable for storing electronic instructions realizing the following steps:
      a) selecting a prescription and optionally design particularity parameters set comprising a plurality of prescription parameters in the list consisting of spherical power (SPH), cylindrical power (CYL), cylinder axis (AXE), addition power (ADD) and selecting a prescription and optionally design particularity range for each selected prescription and optionally design particularity parameter so as to define the prescription and optionally design particularity domain;
      b) meshing the prescription and optionally design particularity domain so as to obtain a representative sample of coordinates within the prescription and optionally design particularity domain and thus providing a plurality of meshing coordinates where each coordinate consists of a series of values of the selected prescription and optionally design particularity parameters within their prescription and optionally design particularity range;
      c) providing an assessment criterion for the selected optical feature of the ophthalmic lens design;
      d) calculating the assessment criterion value for each meshing coordinate of step b); and
      e) providing a sensory representation of the assessment criterion values over the prescription and optionally design particularity domain, and
   evaluating the given lens design by a lens designer or an eye care practitioner.

* * * * *